UNITED STATES PATENT OFFICE.

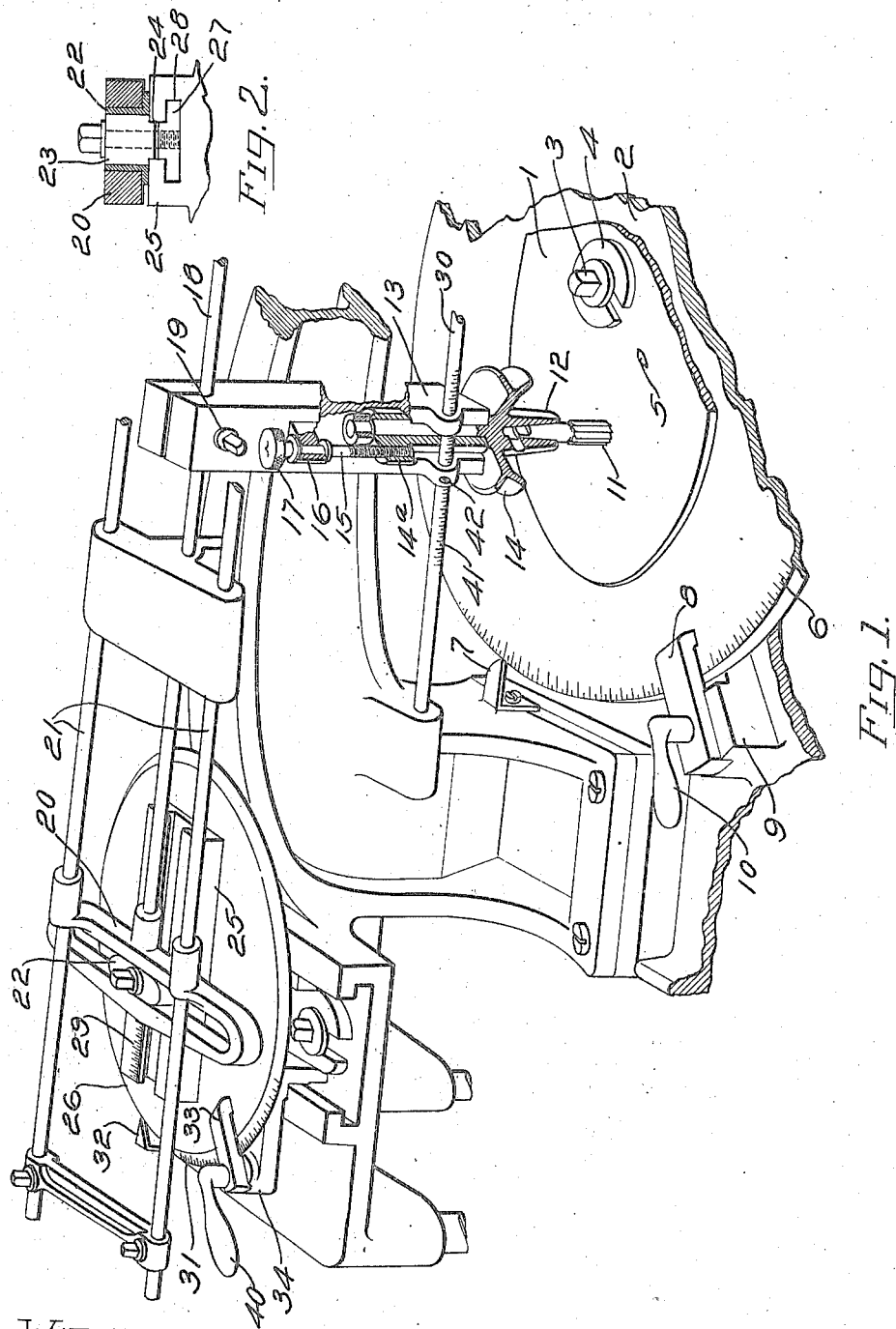

EDWARD E. FOSTER, OF BEVERLY, MASSACHUSETTS.

CAM-PATH-GENERATING MACHINE.

1,248,471.  Specification of Letters Patent.  Patented Dec. 4, 1917.

Application filed October 24, 1913. Serial No. 797,082.

*To all whom it may concern:*

Be it known that I, EDWARD E. FOSTER, a citizen of the United States, residing at Beverly, in the county of Essex and State of Massachusetts, have invented a new and useful Improvement in a Cam-Path-Generating Machine, of which the following is a specification.

As well known to those skilled in the art it is customary in the manufacture of cams to first generate the cam path upon paper and then scratch the outline of the generated cam path upon a leader. The leader is then cut down to the inner working surface of the path after which it is inserted into a cam cutting machine where it directs the operation of the cutting tool. Sometimes the cam path is generated upon wood which is used as a pattern to guide a tool in cutting the leader down to the inner working surface of the cam path. As there are three principal kinds of motion imparted to a follower by a cam, namely, harmonic, uniform and gravity motions, to generate a cam path so that it will impart the proper motion to a follower including the proper sequence of rises, drops and dwells requires considerable knowledge, experience and skill upon the part of the designer. I have discovered that some of the well known mechanical devices are adapted to impart motions corresponding to the harmonic, uniform and gravity motions of a cam follower. For instance, a crank in rotating through 180 degrees imparts a harmonic motion to a driven member, a swinging pendulum has a gravity motion and an inclined plane imparts to a follower equal rises in equal intervals of time, or uniform motion. Therefore, I have conceived the idea of utilizing mechanism other than a pattern in cutting the leader down to the inner working surface of a cam path.

The object of the present invention is to produce a machine for cutting a leader down to the inner working surface of a cam path in such manner as to obviate the necessity of a preliminary generation of the cam path. To the accomplishment of this object and such others as may hereinafter appear the features of the invention relate to certain devices, combinations and arrangement of parts hereinafter described and then set forth broadly and in detail in the appended claims which possess advantages which will be apparent to those skilled in the art.

The various features of the present invention will be best understood from an inspection of the accompanying drawing illustrating one embodiment of the invention, in which, Figure 1 is a perspective, partly in section, of a machine for cutting a leader down to the inner working surface of a cam path; and Fig. 2 is a longitudinal sectional elevation of the crank for shifting the path of travel of the cutter.

In the illustrated embodiment of the invention the leader is cut down to the inner working surface of the cam path by a rotary cutter. The leader is rotated to transfer the point of operation of the cutter around the leader and the cutter is shifted toward and from the axis of rotation of the leader during the rotation thereof to change the direction of the path of travel of the cutter. The cutter is reciprocated by a crank in the specific form of the invention selected for the purpose of illustration and consequently a cam path for imparting a harmonic motion to a cam follower is generated. In order to adapt the machine to generate any desired cam path adjustments are provided for varying the operation of the cutter in accordance with variations in the base circles, rises, drops dwells and times in the different forms of cams to be designed.

The leader 1 is clamped to the upper face of a rotatable disk 2 by a nut 3 and washer 4 and is held from rotation on the disk 2 by a pair of pins 5 projecting from the disk and arranged to engage a pair of holes formed in the leader. The peripheral edge of the disk 2 is provided with an index 6 which coöperates with a pointer 7 carried by the machine frame to serve as a guide for the operative in determining the length of one of the rotative steps of the disk. The disk 2 is held clamped between the rotative steps by a plate 8 slidably mounted in a block 9 formed on the machine frame. The plate 8 is held in clamping position by a clamp 10 arranged to bind the plate to the block 9.

In order to simultaneously generate a cam path and cut the leader down to the inner working surface of the cam path the machine is provided with a cutter 11 the shank of which is carried in the hollow tapered end of a shaft 12 rotatably mounted in a tool carrying frame 13. The shaft 12 carries a sheave 14 which is driven through a belt (not shown) from some suitable source of power. In order to elevate and depress the cutter the shaft 12 carries a sleeve 14ª which is engaged by a screw 15 held from longitudinal movement in a lug 16 formed on the frame 13. The upper end of the screw is provided with a knurled head 17 manipulation of which permits the operative to elevate or depress the cutter. The frame 13 is secured to a horizontal rod 18, mounted to reciprocate in the frame of the machine, by a clamping bolt 19.

With the construction so far described a rotation of the leader will transfer the point of operation of the cutter around the leader. In order to shift the point of operation of the cutter so as to change the direction of its path the rod 18 is connected to a yoke 20 mounted to slide upon guides 21 carried by the frame of the machine. The yoke 20 embraces a rectangular block 22 which is swiveled upon a crank pin 23 slidably mounted in a slot 24 formed on a platform 25. The platform 25 is formed on the upper face of a disk 26 rotatably mounted on the machine frame. The crank pin 23 is mounted on a block 27 which slides in ways 28 formed in the platform 25. With this construction the cutter is reciprocated toward and from the axis of the leader by a crank which is driven by the rotation of the disk 26. As it is desirable to vary the throw of the crank the upper face of the platform 25 is provided with an index 29 to serve as a guide for the operative in adjusting the yoke 20 and its associated parts nearer to or farther from the axis of the disk 26. To guide the cutter 11 to reciprocate radially of the leader 1 the frame of the machine carries a horizontal rod 30 arranged in a vertical plane intersecting the axis of the leader. The rod 30 loosely passes through the frame 13 so that the tool may reciprocate freely thereon and thus be constrained to move radially toward and from the axis of the leader. The peripheral edge of the upper face of the disk 26 is provided with an index 31 which coöperates with the pointer 32 carried by the frame of the machine to serve as a guide for the operative in determining the length of the reciprocating steps imparted to the cutter. The disk 26 is held clamped between the reciprocating steps of the cutter by a plate 33 slidably mounted in a block 34 formed on the frame of the machine. The plate 33 is held in clamping position by a clamp 40 arranged to bind the plate 33 to the block 34.

In using the machine to cut a leader down to the inner working surface of a cam path intended to impart, for instance, a harmonic rise of four inches in 90 degrees, a harmonic drop of four inches in the next 45 degrees, and a dwell during the remaining angle the frame 13 is adjusted upon the rod 30 so that the distance from the center of the shaft 12 to the axis of the leader 1 corresponds to the base circle of the cam path to be generated which, as well known to those skilled in the art, is a circle having its center at the center of the cam path and a radius equal to the shortest distance to the theoretical cam groove. The rod 30 is provided with an index 41 to serve as a guide for the operative in adjusting the cutter for the base circle. After this adjustment is made the frame 13 is temporarily held by a screw 42 which clamps the frame 13 to the rod 30. The bolt 19 is then loosened to free the rod 18, and the yoke 20 is then adjusted along the platform 25 until the axis of the crank pin 23 is two inches from the axis of rotation of the disk 26. This adjustment is made when the platform 25 is at its limit of movement in one direction. After this adjustment is made the frame 13 is unclamped from the rod 30 and again clamped to the rod 18.

Now it being desired to generate a cam path for imparting to a cam follower a harmonic rise of four inches in 90 degrees and to cut the leader down to the inner working surface of the cam path the cutter is rotated and fed downwardly by the operative until a hole is cut through the leader. Experience has demonstrated that it requires thirty cuts to form a ninety degree cam cut in the leader. Consequently after the first cut is formed in the leader the cutter is elevated above the leader and the disk 2 carrying the leader is rotated three degrees and then clamped. As it is necessary to rotate the crank pin 23 through one hundred and eighty degrees while the leader 1 is rotated through ninety degrees in order to obtain a harmonic rise of four inches in ninety degrees the disk 26 is now rotated one-thirtieth of one hundred and eighty degrees or six degrees. Then the cutter is fed downwardly to again cut through the leader. The cutter 11, disk 2 and disk 26 are successively operated in the manner described until the disks 2 and 26 are rotated through ninety and one hundred and eighty degrees respectively. The leader is then provided with a cam path which will impart to a cam follower a harmonic rise of four inches in ninety degrees. To obtain a harmonic drop of four inches in forty-five degrees the disks 2 and 26 are rotated three degrees and twelve degrees at a time respectively after the formation of a cut by the cutter. To obtain a dwell during the remaining angle of two hundred and twenty-five degrees the disk 26 is firmly clamped while the disk 2 and the cutter 11 are operated in the manner hereinbefore referred to.

While the machine has been described as generating a specific cam path it will be readily apparent to those skilled in the art that the machine is adapted to generate any cam path for imparting to a reciprocating cam follower any combination of harmonic motions and dwells as the machine is provided with the necessary adjustments for varying the operation of the tool upon the leader in accordance with the variations in the base circles, rises, drops and times of the cam paths which it may be desired to generate.

While the invention has been illustrated and described in connection with a machine for generating a cam path for imparting harmonic motion to a reciprocating follower it must be understood that this is merely one embodiment of the invention which may have a variety of forms depending upon the kind of motion which it is desired to impart to a follower, the kind of cam to be provided with a cam path and whether the follower is offset or mounted to oscillate or reciprocate. Neither is the specific construction and arrangement of parts shown and described essential nor is the conjoint use of all the features of the invention essential except so far as specified in the appended claims and it may be varied or modified without departing from the principal features of the invention.

What is claimed as new, is:

1. A machine for generating a cam path and cutting a leader down to the inner working surface of the cam path, having, in combination, a cutter movable to cut the leader down to the inner working surface of the cam path, mechanism for relatively moving the leader and cutter to transfer the point of operation of the cutter around the leader, and means for varying the said relative movement to generate a continuous cam path having differential drops and rises therein, substantially as described.

2. A machine for generating a cam path and cutting a leader down to the inner working surface of the cam path, having, in combination, a cutter movable to cut the leader down to the inner working surface of the cam path, mechanism for relatively moving the leader and cutter to transfer the point of operation of the cutter around the leader, and means for varying the said relative movement to generate a continuous harmonic motion cam path having differential drops and rises therein, substantially as described.

3. A machine for generating a cam path and cutting a leader down to the inner working surface of the cam path, having, in combination, a cutter, a leader support rotatable to transfer the point of operation of the cutter around the leader, and mechanism other than a pattern for shifting the cutter toward and from the axis of the leader to change the direction of its path, substantially as described.

4. A machine for generating a cam path and cutting a leader down to the inner working surface of the cam path, having, in combination, a cutter, a leader support rotatable to transfer the point of operation of the cutter around the leader, and a crank for shifting the cutter toward and from the axis of the leader to change the direction of its path, substantially as described.

5. A machine for generating a cam path and cutting a leader down to the inner working surface of the cam path, having, in combination, a cutter, a leader support rotatable relative to the cutter, mechanism for shifting the cutter toward and from the axis of the leader to change the direction of its path around the leader for varying the said relative movement of the leader and cutter to generate a continuous cam path having differential drops and rises therein.

EDWARD E. FOSTER.

Witnesses:
CHARLES E. GRUSH,
ELMER B. GRUSH.